United States Patent
Lu et al.

(10) Patent No.: US 12,041,374 B2
(45) Date of Patent: Jul. 16, 2024

(54) SEGMENTATION-BASED VIDEO CAPTURING METHOD, APPARATUS, DEVICE AND STORAGE MEDIUM

(71) Applicant: Lemon Inc., Grand Cayman (KY)

(72) Inventors: Zhixiong Lu, Beijing (CN); Zhili Chen, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 18/088,167

(22) Filed: Dec. 23, 2022

(65) Prior Publication Data
US 2023/0131151 A1 Apr. 27, 2023

Related U.S. Application Data

(63) Continuation of application No. PCT/SG2021/050519, filed on Aug. 30, 2021.

(30) Foreign Application Priority Data

Sep. 9, 2020 (CN) .......................... 202010937922.0

(51) Int. Cl.
*H04N 5/262* (2006.01)
*G06T 7/11* (2017.01)
(Continued)

(52) U.S. Cl.
CPC ............. *H04N 5/2621* (2013.01); *G06T 7/11* (2017.01); *H04N 5/2628* (2013.01);
(Continued)

(58) Field of Classification Search
CPC .... H04N 5/2621; H04N 5/2628; H04N 5/265; H04N 23/80; H04N 5/272; H04N 23/60;
(Continued)

(56) References Cited

U.S. PATENT DOCUMENTS

2005/0225566 A1* 10/2005 Kojo ...................... H04N 5/272
348/E5.058
2011/0090311 A1* 4/2011 Fang ..................... H04N 13/286
348/43
(Continued)

FOREIGN PATENT DOCUMENTS

CN 101588459 A 11/2009
CN 106952276 A 7/2017
(Continued)

OTHER PUBLICATIONS

Liu, Q., "Matting-based Interactive Image Editing," Dissertation Submitted to Shanghai Jiao Tong University for Master Degree of Engineering, Dec. 2010, pp. 1-80.
(Continued)

*Primary Examiner* — Hung H Lam
(74) *Attorney, Agent, or Firm* — Astute IP Law Group

(57) ABSTRACT

A video capturing method, an apparatus, a device and a storage medium are provided. The method is applied to a terminal device, the terminal device includes a camera, and the method includes: segmenting a to-be-segmented target object to obtain a target segmentation result in response to an input event of selecting the to-be-segmented target object among a plurality of objects presented in an acquisition image of the camera; displaying the target segmentation result; and fusing the target segmentation result, that is adjusted, with a to-be-fused video scene to generate a video in response to a triggering operation for adjusting the target segmentation result.

20 Claims, 7 Drawing Sheets

(51) Int. Cl.
*H04N 5/265* (2006.01)
*H04N 23/80* (2023.01)

(52) U.S. Cl.
CPC ............. *H04N 5/265* (2013.01); *H04N 23/80* (2023.01); *G06T 2207/20092* (2013.01); *G06T 2207/20221* (2013.01)

(58) Field of Classification Search
CPC ............ G06T 7/11; G06T 2207/20092; G06T 2207/20221; G06T 7/10; G06T 2207/10016; G06T 2207/20081; G06T 2207/20084; G06T 2207/30244; G06T 7/70; G06F 3/04842; G06F 2203/04806; G06F 3/04845
See application file for complete search history.

(56) References Cited

U.S. PATENT DOCUMENTS

| | | | |
|---|---|---|---|
| 2019/0034746 A1* | 1/2019 | Feng | G06T 7/0002 |
| 2019/0182453 A1 | 6/2019 | Lim et al. | |
| 2020/0145644 A1 | 5/2020 | Cordes et al. | |
| 2020/0213532 A1 | 7/2020 | Yuan et al. | |
| 2021/0152753 A1* | 5/2021 | Zhu | H04N 5/265 |

FOREIGN PATENT DOCUMENTS

| | | | | |
|---|---|---|---|---|
| CN | 106997618 A | | 8/2017 | |
| CN | 107623824 A | | 1/2018 | |
| CN | 109286760 A | | 1/2019 | |
| CN | 109542307 A | | 3/2019 | |
| CN | 110290425 A | | 9/2019 | |
| CN | 110517187 A | | 11/2019 | |
| CN | 111093026 A | * | 12/2019 | ........... H04N 23/632 |
| CN | 111064905 A | | 4/2020 | |
| CN | 111093026 A | | 5/2020 | |
| CN | 107481261 B | | 6/2020 | |
| CN | 111292337 A | | 6/2020 | |
| CN | 111316627 A | | 6/2020 | |
| CN | 111447389 A | | 7/2020 | |
| JP | 2014096757 A | | 5/2014 | |
| JP | 2014131281 A | | 7/2014 | |
| JP | 2015060366 A | | 3/2015 | |
| JP | 2020048025 A | | 3/2020 | |
| WO | 2019090502 A1 | | 5/2019 | |

OTHER PUBLICATIONS

Tao et al., "Universal Foreground Segmentation Based on Deep Feature Fusion Network for Multi-Scene Videos," IEEE Access, Oct. 31, 2019, vol. 7, pp. 158326-158337.
Yan, C., "Interactive Video Editor Based on Segmentation and Fusion," Full Text Database of China's Outstanding Master's Thesis (Information Technology Series), Issue 10, Oct. 15, 2010, 33 pages.
Yue et al., "New Method for Detecting and Dividing Vehicles Blocking," Computer Engineering and Applications, 2012, vol. 48, No. 19, pp. 179-182.
Zhang et al., "Detecting and Extracting the Photo Composites Using Planar Homography and Graph Cut," IEEE Transactions on Information Forensics and Security, Sep. 2010, vol. 5, No. 3, pp. 544-555.
International Search Report and Written Opinion in PCT/SG2021/050519, mailed Dec. 28, 2021, 7 pages.
Extended European Search Report in EP21867243.4, mailed Jul. 26, 2023, 13 pages.
Yang et al., "Video Segmentation via Multiple Granularity Analysis," 2017 IEEE Conference on Computer Vision and Pattern Recognition, 2017, pp. 6383-6392.
Office Action for Japanese Patent Application No. 2023-503179, mailed Mar. 5, 2024, 14 pages.

* cited by examiner

SEGMENTATION-BASED VIDEO CAPTURING METHOD, APPARATUS, DEVICE AND STORAGE MEDIUM

This application is a continuation of International Patent Application No. PCT/SG2021/050519, filed on Aug. 30, 2021, which claims the priority to Chinese patent application No. 202010937922.0, filed on Sep. 9, 2020. All the aforementioned patent applications are hereby incorporated by reference in their entireties.

TECHNICAL FIELD

Embodiments of the present disclosure relate to a video capturing method, an apparatus, a device and a storage medium.

BACKGROUND

With the development of the Internet, short videos are gradually being liked by people, and more and more people like to shoot short videos and upload them to Internet platforms for sharing.

At present, an implementation scheme of short video creation is to select a preset addition effect, such as a sticker, in short video capturing applications, and then create short videos.

However, the inventor(s) of the present application found that the traditional video capturing has the technical problems: the creation method of short videos is monotonous, the user can only select a fixed addition effect to create short videos, and the user experience is poor.

SUMMARY

Embodiments of the present disclosure provide a video capturing method, an apparatus, a device, and a storage medium, to solve problems such as the creation method of the short videos is monotonous, the user can only select a fixed addition effect to create the short videos, and the user experience is poor.

In a first aspect, the embodiments of the present disclosure provide a video capturing method, which is applied to a terminal device. The method includes: segmenting a to-be-segmented target object to obtain a target segmentation result in response to an input event of selecting the to-be-segmented target object among a plurality of objects presented in an acquisition image of the camera; displaying the target segmentation result; and fusing the target segmentation result, that is adjusted, with a to-be-fused video scene to generate a video in response to a triggering operation for adjusting the target segmentation result.

In a second aspect, the embodiments of the present disclosure provide a video capturing apparatus, which includes: a segmentation module, configured to segment a to-be-segmented target object to obtain a target segmentation result in response to an input event of selecting the to-be-segmented target object among a plurality of objects presented in an acquisition image of the camera; a display module, configured to display the target segmentation result; and a fusion module, configured to fuse the target segmentation result, that is adjusted, with a to-be-fused video scene to generate a video in response to a triggering operation for adjusting the target segmentation result.

In a third aspect, the embodiments of the present disclosure provide an electronic device, which includes at least one processor and a memory. The memory stores computer-executable instructions; and the at least one processor executes the computer-executable instructions stored in the memory to cause the at least one processor to perform the video capturing methods described in the first aspect and various possible designs of the first aspect.

In a fourth aspect, the embodiments of the present disclosure provide a computer-readable storage medium, the computer-executable instructions are stored in the computer-readable storage medium, and when a processor executes the computer-executable instructions, the processor implements the video capturing methods described in the first aspect and various possible designs of the first aspect.

Embodiments of the present disclosure provide a video capturing method, an apparatus, a device and a storage medium. The method includes: segmenting a to-be-segmented target object to obtain a target segmentation result in response to an input event of selecting the to-be-segmented target object among a plurality of objects presented in an acquisition image of the camera; displaying the target segmentation result; and fusing the target segmentation result, that is adjusted, with a to-be-fused video scene to generate a video in response to a triggering operation for adjusting the target segmentation result. The embodiments of the present disclosure can segment the to-be-segmented target object in real time during the video capturing process. Compared with the solution of segmenting the to-be-segmented target object offline, the embodiments of the present disclosure can shorten the video capturing time and improve the timeliness of the salient object segmentation during the video capturing process. In addition, by fusing the target segmentation result, that is adjusted, with a to-be-fused video scene in response to a triggering operation for adjusting the target segmentation result, the target segmentation result can be edited in real time to achieve video creation for the real-time segmented object, thus providing users with a new video creation method and improving the effect of user experience.

BRIEF DESCRIPTION OF THE DRAWINGS

In order to more clearly illustrate the technical solutions in the embodiments of the present disclosure or in the prior art, the following briefly introduces the drawings that are used in the description of the embodiments or the prior art. Obviously, the drawings in the following description are some embodiments of the present disclosure, and for those skilled in the art, other drawings can also be obtained from these drawings without any inventive work.

DETAILED DESCRIPTION

In order to make objects, technical solutions and advantages of the embodiments of the present disclosure apparent, the technical solutions of the embodiments will be described in a clearly and fully understandable way in connection with the drawings related to the embodiments of the disclosure. Apparently, the described embodiments are just a part but not all of the embodiments of the present disclosure. Based on the embodiments of the present disclosure, those skilled in the art can obtain other embodiment(s), without any inventive work, which should be within the scope of the present disclosure.

Figure 1:
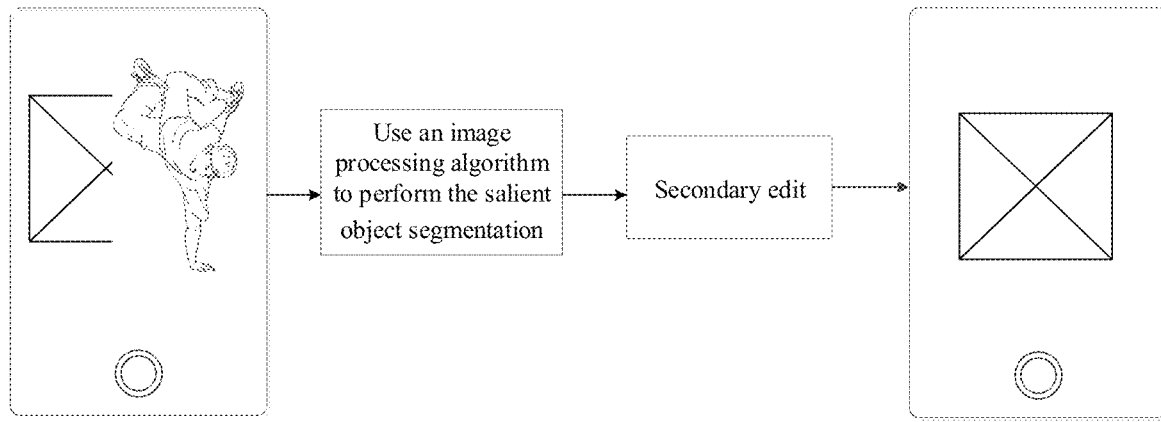
FIG. 1 is an example diagram of video capturing in the prior art.

Referring to FIG. 1, FIG. 1 is an example diagram of video capturing in the prior art. In the prior art, the salient object segmentation for a plurality of objects is to capture an image including the plurality of objects, and then use an image processing algorithm to perform the salient object segmentation on the captured image.

In addition, when users capture short videos, the users select a preset addition effect, such as a sticker, in short video capturing applications, and then generate short videos. This creation method of the short videos is relatively monotonous for the users, and the users can only select a fixed addition effect to add to the short videos, and the user experience is poor.

The embodiments of the present disclosure provide a brand-new video creation method, which solves the above-mentioned problems by segmenting the salient objects in real time in images acquired by a camera, and editing the target segmentation objects in real time, and then performing short video creation for the salient objects segmented and edited in real time.

Figure 2:
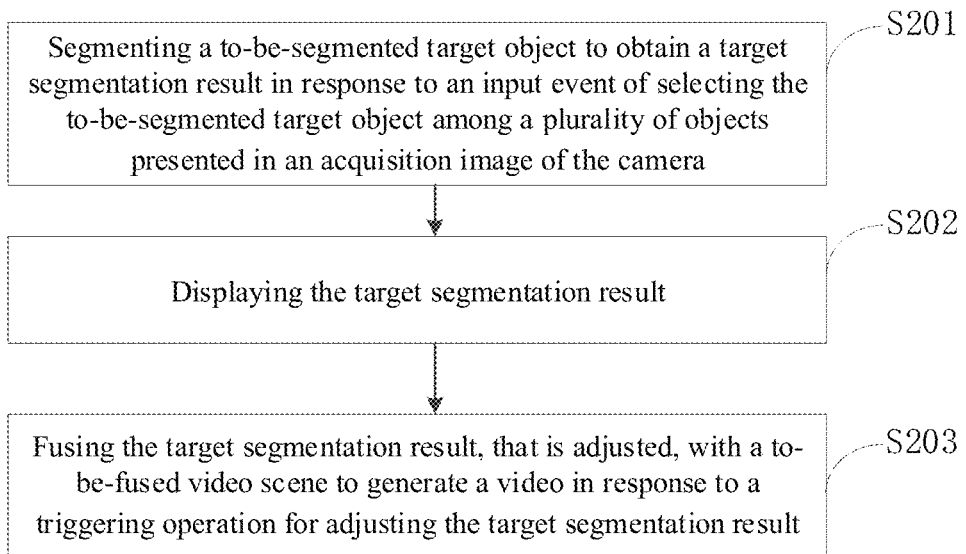
FIG. 2 is a first schematic flowchart of a video capturing method provided by an embodiment of the present disclosure.

Referring to FIG. 2, FIG. 2 is a first schematic flowchart of a video capturing method provided by an embodiment of the present disclosure. The method of this embodiment can be applied to a terminal device, and the video capturing method includes:

S201: segmenting a to-be-segmented target object to obtain a target segmentation result in response to an input event of selecting the to-be-segmented target object among a plurality of objects presented in an acquisition image of the camera.

In this embodiment, after the terminal device starts a camera, a plurality of objects are displayed in the acquisition image of the camera, and the user can select one of the plurality of objects as the to-be-segmented target object. After selecting the to-be-segmented target object, the step of segmenting the to-be-segmented target object is performed, thereby obtaining the target segmentation result.

Optionally, in order to facilitate the user to understand the operation steps of the video capturing process in this embodiment, prompt information may also be displayed on a capturing interface of the terminal device to prompt the user to input the to-be-segmented target object in the terminal device.

Figure 3:
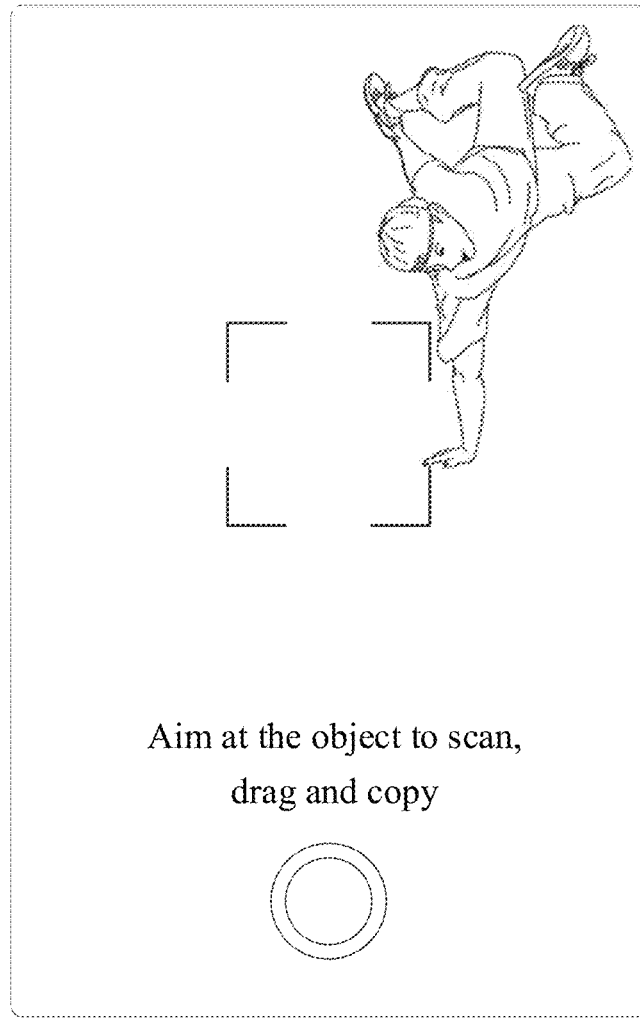
FIG. 3 illustrates a schematic diagram of an acquisition image of a terminal device.

Referring to FIG. 3, FIG. 3 illustrates a schematic diagram of an acquisition image of a terminal device. Exemplarily, the user opens the camera of the terminal device, and the words "aim at the object to scan, drag and copy" may appear on the acquisition image to prompt the user to input the to-be-segmented target object in the terminal device and copy the to-be-segmented target object.

S202: displaying the target segmentation result.

Specifically, the target segmentation result is displayed in the acquisition image of the camera. The target segmentation result may be displayed in a display manner different from the display manner of other objects in the acquisition image.

S203: fusing the target segmentation result, that is adjusted, with a to-be-fused video scene to generate a video in response to a triggering operation for adjusting the target segmentation result.

In this embodiment, the triggering operation for adjusting the target segmentation result includes at least one selected from a group consisting of: zooming out, zooming in, moving, and rotating. Specifically, the user can perform operations such as zooming out, zooming in, moving, and rotating by touching the screen.

Optionally, the to-be-fused video scene may be a real environment captured by the camera, and the camera here is not limited to a front camera or a rear camera.

Specifically, the fusion of the target segmentation result that is adjusted with the to-be-fused video scene may be performed by placing the target segmentation result in the real environment captured by the camera by using the simultaneous localization and mapping (SLAM) technology, which is also known as the concurrent mapping and localization (CIVIL) technology, and fusing the target segmentation result, that is adjusted, with the real environment captured by the camera.

The embodiment of the present disclosure includes the following steps: segmenting the to-be-segmented target object to obtain the target segmentation result in response to the input event of selecting the to-be-segmented target object among the plurality of objects presented in the acquisition image of the camera; displaying the target segmentation result; and fusing the target segmentation result, that is adjusted, with the to-be-fused video scene to generate the video in response to the triggering operation for adjusting the target segmentation result. The present embodiment can segment the to-be-segmented target object in real time during the video capturing process. Compared with the solution of segmenting the to-be-segmented target object offline in advance and adding the to-be-segmented target object to the short video as a sticker, the present embodiment can shorten the video capturing time and improve the timeliness of the salient object segmentation during the video capturing process. In addition, by fusing the target segmentation result, that is adjusted, with a to-be-fused video scene in response to the triggering operation for adjusting the target segmentation result, the target segmentation result can be edited in real time to realize video creation for the real-time segmented object, thus providing users with a new video creation method and improving the effect of user experience.

In an embodiment of the present disclosure, on the basis of the above-mentioned embodiment in FIG. 2, in order to facilitate the user to select a desired matting region and improve the matting accuracy in the process of determining the to-be-segmented target object, it is detected whether the image region where the object displayed in the acquisition image is located includes a preset cursor. If the image region where the object displayed in the acquisition image is located includes the preset cursor, it is determined that the object displayed in the current image region is the to-be-segmented target object.

Optionally, the preset cursor may select a position of any region in the acquisition image as the position where the preset cursor is located.

Figure 4:
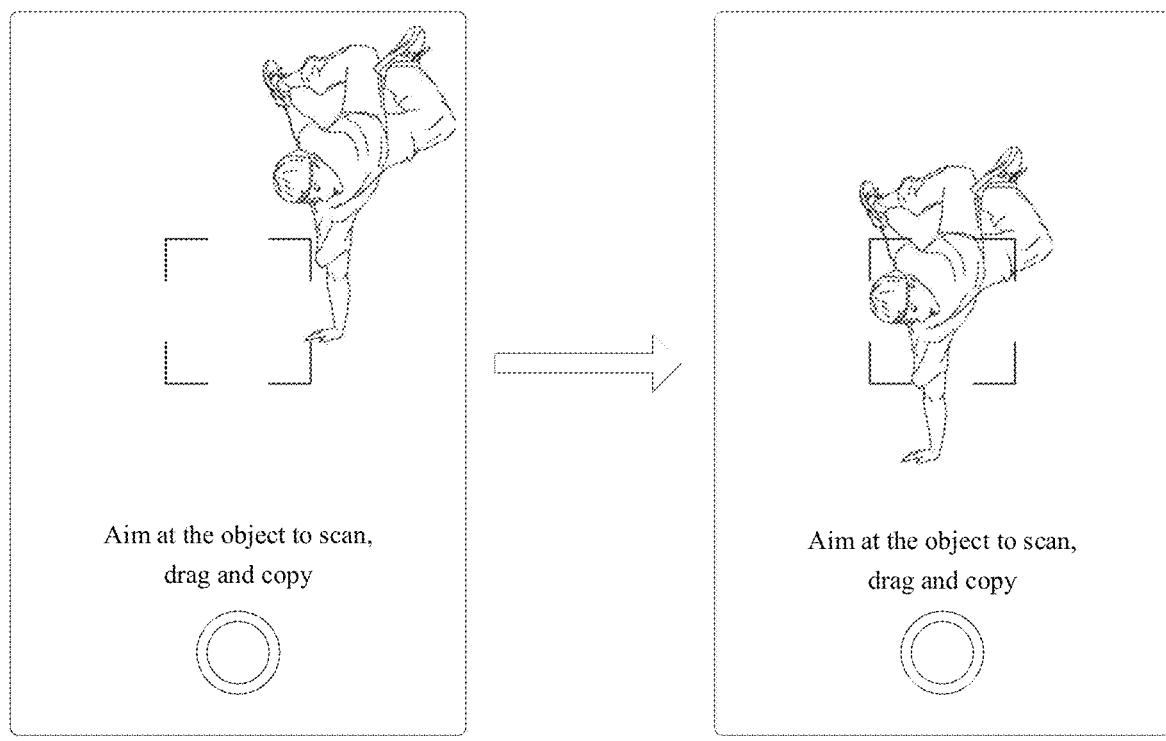
FIG. 4 illustrates a schematic diagram of aligning a to-be-segmented target object with a preset cursor by moving a terminal device.

In an optional implementation, the position of the preset cursor may be fixed, and the preset cursor may be aligned with the to-be-segmented target object by moving the terminal device. Exemplarily, the position of the preset cursor may be fixed as the center position of the display screen of the terminal device. Referring to FIG. 4, FIG. 4 illustrates a schematic diagram of aligning the to-be-segmented target object with the preset cursor by moving the terminal device.

Figure 5:
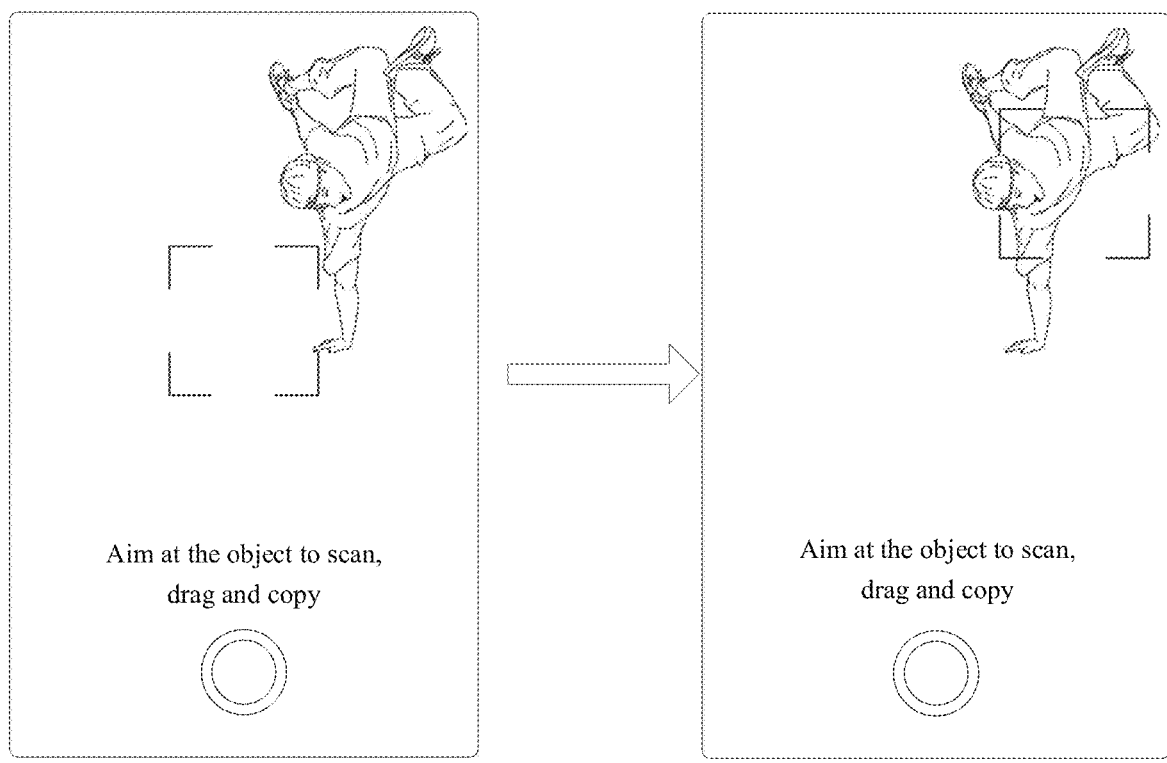
FIG. 5 illustrates a schematic diagram of aligning a preset cursor with a to-be-segmented target object by moving a position of the preset cursor.

In another optional implementation manner, the position of the preset cursor may not be fixed, and the preset cursor may be aligned with the to-be-segmented target object by moving the position of the preset cursor. Referring to FIG. 5, FIG. 5 illustrates a schematic diagram of aligning the preset cursor with the to-be-segmented target object by moving the position of the preset cursor. It should be understood that the cursors in the form of blocks illustrated in FIG. 3, FIG. 4 and FIG. 5 are exemplary descriptions, and do not limit the specific display manner of the cursors.

On the basis of the embodiment illustrated in FIG. 5, in order to avoid misrecognition, it can be determined that the object aligned with the preset cursor in the acquisition image is the to-be-segmented target object after detecting that the preset cursor is aligned with the object displayed in the acquisition image exceeding a preset time period. Optionally, the preset time period may be set to 3 seconds to 5 seconds. It should be understood that those skilled in the art may set the preset time period according to actual needs, which is not specifically limited in the present disclosure.

Specifically, detecting whether the image region where the object displayed in the acquisition image is located includes the preset cursor includes: determining a coordinate position of the preset cursor in the acquisition image; determining coordinate positions included in the image region where the object displayed in the acquisition image is located to obtain a coordinate position range; comparing the coordinate position of the preset cursor with the coordinate position range of the object displayed in the acquisition image; and determining that the object currently displayed in the acquisition image is the to-be-segmented target object if the coordinate position of the preset cursor is within the coordinate position range of the object displayed in the acquisition image.

Exemplarily, when comparing the coordinate position of the preset cursor with the coordinate position range of the object displayed in the acquisition image, the coordinate position range includes an abscissa range and an ordinate range, and the coordinate position of the preset cursor includes an abscissa and an ordinate; in this case, the above-mentioned step includes: respectively determining whether the abscissa of the preset cursor is within the abscissa range of the object displayed in the acquisition image, and determining whether the ordinate of the preset cursor is within the ordinate range of the object displayed in the acquisition image; and determining that the object currently displayed in the acquisition image is the to-be-segmented target object if the abscissa of the preset cursor is within the abscissa range of the object displayed in the acquisition image and the ordinate of the preset cursor is within the ordinate range of the object displayed in the acquisition image.

Figure 6:
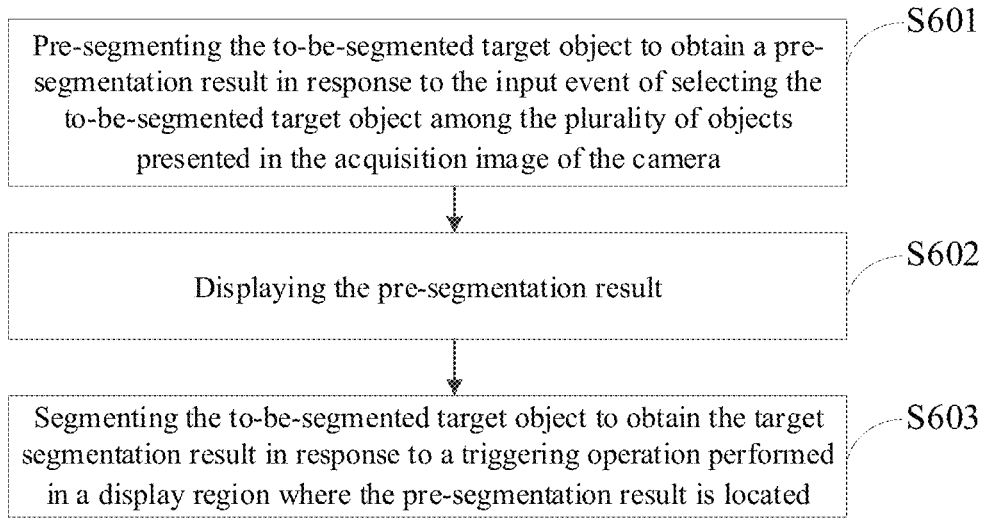
FIG. 6 is a second schematic flowchart of a video capturing method provided by an embodiment of the present disclosure.

Referring to FIG. 6, FIG. 6 is a second schematic flowchart of a video capturing method provided by an embodiment of the present disclosure. On the basis of the embodiment illustrated in FIG. 2, S201 specifically includes:

S601: pre-segmenting the to-be-segmented target object to obtain a pre-segmentation result in response to the input event of selecting the to-be-segmented target object among the plurality of objects presented in the acquisition image of the camera.

In the present embodiment, the terminal device receives the input event of selecting the to-be-segmented target object, and the input event includes the user selecting the to-be-segmented target object. The terminal device pre-segments the to-be-segmented target object among the plurality of objects presented in the acquisition image of the camera in response to the input event. Pre-segmentation may be understood as coarse-grained segmentation, and the pre-segmentation aims to quickly segment the to-be-segmented target object. Therefore, the pre-segmentation can segment a general outline of the to-be-segmented target object.

S602: displaying the pre-segmentation result.

In the present embodiment, the pre-segmentation result may be displayed in the acquisition image of the camera, so as to facilitate the user to confirm whether the pre-segmentation result includes the to-be-segmented target object that is desired.

S603: segmenting the to-be-segmented target object to obtain the target segmentation result in response to a triggering operation performed in a display region where the pre-segmentation result is located.

In the present embodiment, the segmentation of the to-be-segmented target object may be understood as fine-grained segmentation, which aims to accurately segment the to-be-segmented target object. Therefore, the segmentation accuracy of the target segmentation result is greater than the segmentation accuracy of the pre-segmentation result.

After displaying the pre-segmentation result in step S602, the user can visually see the pre-segmentation result, so as to conveniently confirm whether the pre-segmentation result includes the to-be-segmented target object that the user desires. If the user performs a triggering operation in the display region where the pre-segmentation result is located, it means that the user confirms the pre-segmentation result, and then triggers the operation of fine-grained segmentation of the to-be-segmented target object, so as to obtain a target segmentation result with higher accuracy.

In the present embodiment, the triggering operation for confirming the pre-segmentation result may be realized by the user through touching the screen, such as clicking on the pre-segmentation result, sliding in the display region of the pre-segmentation result, etc., or may be realized by voice control, or may be realized by air gesture control.

The embodiment of the present disclosure includes: pre-segmenting the to-be-segmented target object to obtain the pre-segmentation result in response to the input event of selecting the to-be-segmented target object among the plurality of objects presented in the acquisition image of the camera; displaying the pre-segmentation result; and segmenting the to-be-segmented target object to obtain the target segmentation result in response to the triggering operation performed in the display region where the pre-segmentation result is located. Because the to-be-segmented target object is pre-segmented, the timeliness of the salient object segmentation is guaranteed. After that, the to-be-segmented target object is finely segmented to obtain a target segmentation result with a segmentation accuracy greater than the segmentation accuracy of the pre-segmentation result, which can further ensure the quality of salient object segmentation, so as to take into account both timeliness and segmentation quality.

In an embodiment of the present disclosure, on the basis of the above-mentioned embodiment in FIG. 2, the guarantee of timeliness and segmentation quality may be achieved by different salient object segmentation algorithms.

Specifically, pre-segmenting the to-be-segmented target object to obtain the pre-segmentation result in response to the input event of selecting the to-be-segmented target object among the plurality of objects presented in the acquisition image of the camera includes: pre-segmenting the to-be-segmented target object according to a first salient object segmentation algorithm to obtain the pre-segmentation result in response to the input event of selecting the to-be-segmented target object among the plurality of objects presented in the acquisition image of the camera.

Specifically, segmenting the to-be-segmented target object to obtain the target segmentation result in response to the triggering operation performed in the display region where the pre-segmentation result is located includes: in response to the triggering operation performed in the display region where the pre-segmentation result is located, segmenting the to-be-segmented target object to obtain the target segmentation result according to a second salient object segmentation algorithm.

The segmentation speed of the first salient object segmentation algorithm is greater than a preset segmentation speed, and the segmentation accuracy of the first salient object segmentation algorithm is lower than the segmentation accuracy of the second salient object segmentation algorithm. The first salient object segmentation algorithm and the second salient object segmentation algorithm may select known salient object segmentation algorithms, and any salient object segmentation algorithm whose segmentation speed is greater than the preset segmentation speed may be used as the first salient object segmentation algorithm. The salient object segmentation algorithms, in which one salient object segmentation algorithm has a fast segmentation speed while the other salient object segmentation algorithm has a high segmentation quality, may be applied to the embodiments of the present disclosure, and the present disclosure does not limit the specific types of the first salient object segmentation algorithm and the second salient object segmentation algorithm.

Optionally, in the present embodiment, the preset segmentation speed may be determined according to an average value of the segmentation speeds that can be achieved by known salient object segmentation methods.

In another embodiment of the present disclosure, on the basis of the above-mentioned embodiment in FIG. 2, the guarantee of timeliness and segmentation quality can also be achieved by a model obtained by training a neural network.

Figure 7A:
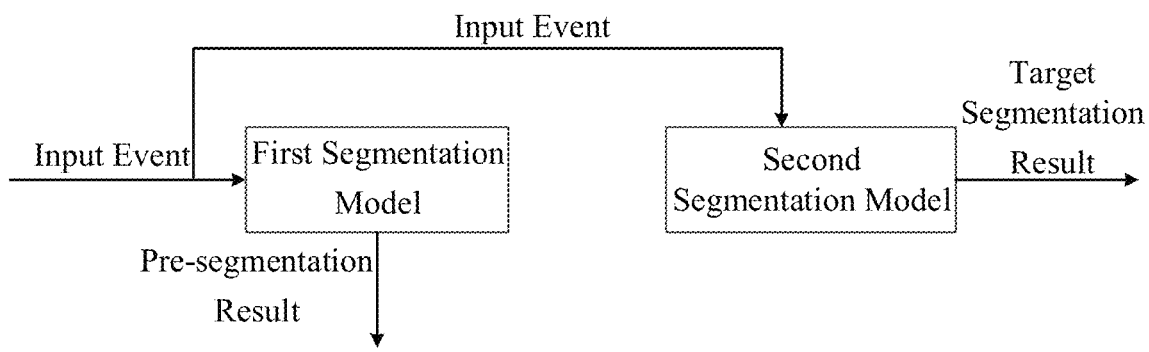
FIG. 7A illustrates a first schematic diagram of segmentation by a first segmentation model and a second segmentation model.

Referring to FIG. 7A, FIG. 7A illustrates a first schematic diagram of segmentation by a first segmentation model and a second segmentation model.

Specifically, pre-segmenting the to-be-segmented target object to obtain the pre-segmentation result in response to the input event of selecting the to-be-segmented target object among the plurality of objects presented in the acquisition image of the camera includes: pre-segmenting the to-be-segmented target object according to a first segmentation model to obtain the pre-segmentation result in response to the input event of selecting the to-be-segmented target object among the plurality of objects presented in the acquisition image of the camera. The first segmentation model is obtained by training a neural network according to a plurality of training images, each of the plurality of training image includes a plurality of objects, and the plurality of objects in the training image may be arbitrary objects.

Specifically, segmenting the to-be-segmented target object to obtain the target segmentation result in response to the triggering operation performed in the display region where the pre-segmentation result is located includes: segmenting the to-be-segmented target object to obtain the target segmentation result in response to the triggering operation performed in the display region where the pre-segmentation result is located, segmenting the to-be-segmented target object according to a second segmentation model to obtain the target segmentation result. The second segmentation model is obtained by training a neural network according to a plurality of training images, and each of the plurality of training image includes a plurality of objects.

The segmentation speed of the first segmentation model is greater than the preset segmentation speed, and the segmentation accuracy of the first segmentation model is lower than the segmentation accuracy of the second segmentation model.

In the present embodiment, the preset segmentation speed may also be determined according to the average value of the segmentation speeds that can be achieved by known salient object segmentation methods.

Figure 7B:
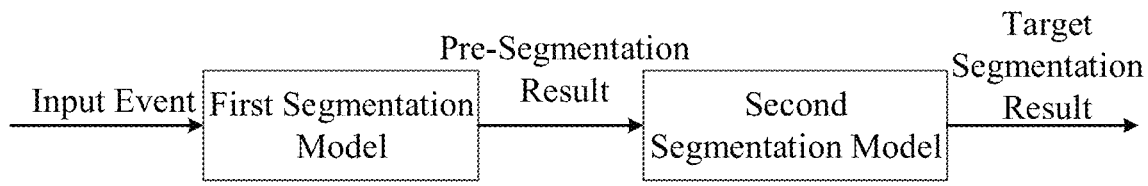
FIG. 7B illustrates a second schematic diagram of segmentation by a first segmentation model and a second segmentation model.

Optionally, in order to improve the segmentation speed of the second segmentation model, the second segmentation model may also perform secondary segmentation on the basis of the pre-segmentation result. Referring to FIG. 7B, FIG. 7B illustrates a second schematic diagram of segmentation by a first segmentation model and a second segmentation model. Specifically, the method includes: pre-segmenting the to-be-segmented target object according to the first segmentation model to obtain the pre-segmentation result in response to the input event of selecting the to-be-segmented target object among the plurality of objects presented in the acquisition image of the camera; and in response to the triggering operation performed in the display region where the pre-segmentation result is located and on the basis of the pre-segmentation result, re-segmenting the pre-segmentation result according to a second segmentation model to obtain the target segmentation result.

In an embodiment of the present disclosure, displaying the pre-segmentation result includes: outlining the pre-segmentation result; and displaying an outline of the pre-segmentation result.

Figure 8:
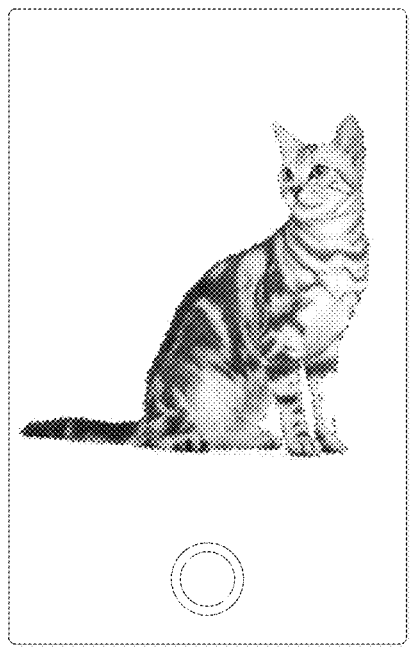
FIG. 8 illustrates a schematic diagram of displaying an outline of a pre-segmentation result with dotted lines.

Optionally, the outline may be displayed as different forms of lines, such as colored lines, dotted lines, solid lines, etc., which are not limited in the present disclosure. Referring to FIG. 8, FIG. 8 illustrates a schematic diagram of displaying an outline of a pre-segmentation result with dotted lines.

Specifically, displaying the outline of the pre-segmentation result includes: if a portion of the to-be-segmented target object is covered by other objects other than the to-be-segmented target object, displaying an outline of a covered portion of the to-be-segmented target object in a first display state, and displaying an outline of an uncovered portion of the to-be-segmented target object in a second display state. The display attribute of the first display state is different from the display attribute of the second display state.

In the present embodiment, the display attribute includes explicit display, semi-transparent display, and transparent display. The display attribute of the first display state may be any display attribute in the display attributes, and the display attribute of the second display state may also be any display attribute in the display attributes, as long as the display attributes of the first display state and the second display state are different.

Figure 9:
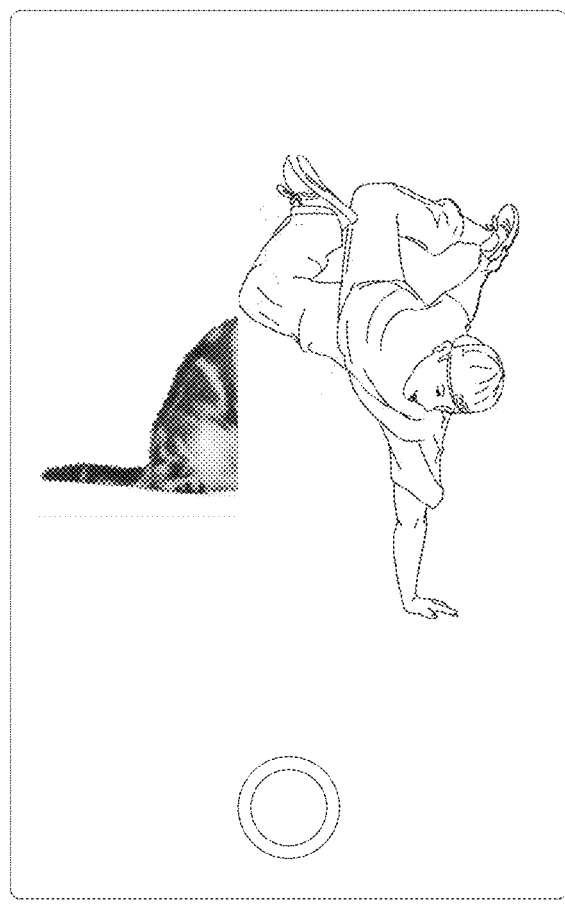
FIG. 9 illustrates a schematic diagram of displaying an outline of a covered portion of the to-be-segmented target object by way of explicit display, and displaying an outline of an uncovered portion of the to-be-segmented target object by way of semi-transparent display.

Exemplarily, the first display state may be a semi-transparent display state, and the second display state may be an explicit display state. Referring to FIG. 9, FIG. 9 illustrates a schematic diagram of displaying an outline of a covered portion of the to-be-segmented target object by way of explicit display, and displaying an outline of an uncovered portion of the to-be-segmented target object by way of semi-transparent display.

Optionally, after detecting the outline boundary of the to-be-segmented target object and displaying the outline boundary in the form of outline, the method of the present embodiment may further include: detecting whether the outline boundary is stable; if the outline boundary is unstable, performing stability processing on the outline boundary. Whether the outline boundary is stable may be determined through phenomena such as whether the outline is flickering and jumping between a plurality of objects, and the like. In the pre-segmentation process, the pre-segmentation process is performed in real time. If the outline does not flicker and does not jump between a plurality of objects, it is considered that the outline boundary is stable. The stability processing of the outline boundary may be achieved by the segmentation time of the salient object segmentation algorithm, that is, if the outline boundary of the pre-segmentation result is unstable, the user may not confirm the pre-segmentation result, and confirm the pre-segmentation result after the outline boundary of the pre-segmentation result is stable.

In the embodiments of the present disclosure, the pre-segmentation result is outlined, and the outline of the pre-segmentation result is displayed, which can facilitate the user to confirm whether the pre-segmentation result conforms to an expected segmentation effect.

Figure 10:
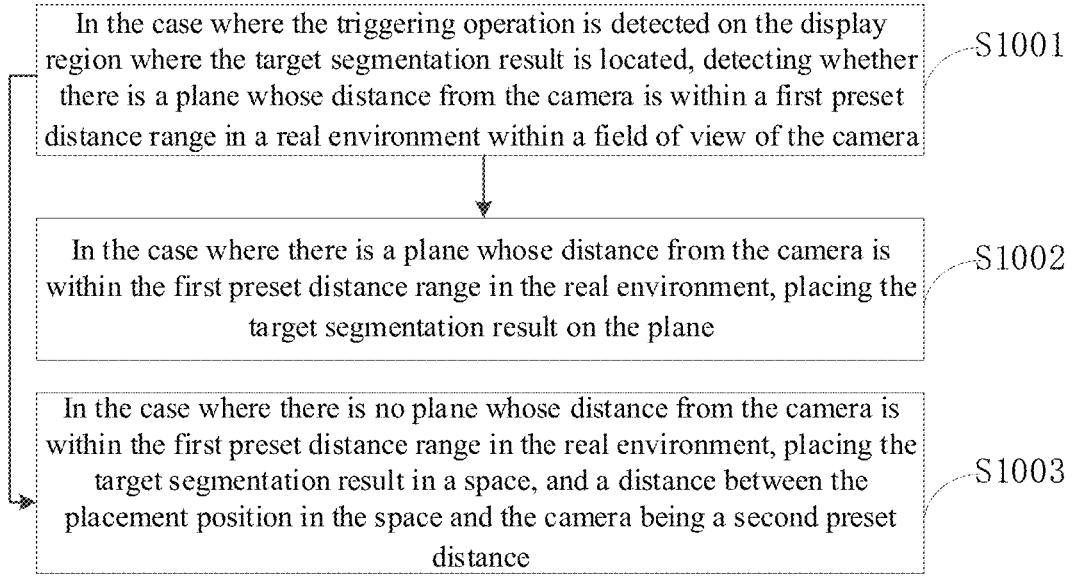
FIG. 10 is a third schematic flowchart of a video capturing method provided by an embodiment of the present disclosure.

Referring to FIG. 10, FIG. 10 is a third schematic flowchart of a video capturing method provided by an embodiment of the present disclosure. In the present embodiment, on the basis of any of the above-mentioned embodiments, S203 includes:

S1001: if the triggering operation is detected on the display region where the target segmentation result is located, detecting whether there is a plane whose distance from the camera is within a first preset distance range in a real environment within a field of view of the camera.

In the present embodiment, the plane detected is a plane for placing the target segmentation result, which can be any plane in the acquisition image, such as any plane in a space such as a wall, a surface of a table, the ground, a surface of a cabinet, and the like.

Exemplarily, if the first preset distance is 5 meters, this step is to detect a plane, whose distance from the camera is less than or equal to 5 meters within the field of view of the camera of the terminal device.

S1002: if there is a plane whose distance from the camera is within the first preset distance range in the real environment, placing the target segmentation result on the plane.

Exemplarily, within a field of view of 5 meters from the camera, if a plane that can be used to place the target segmentation result is detected, the target segmentation result is directly placed on the detected plane.

Optionally, when the target segmentation result is placed on the detected plane, the shadow of the contact surface between the target segmentation result and the detected plane may also be displayed to obtain a better display effect. How to display the shadow of the contact surface may be referred to the introduction of the prior art, and is not described in detail here.

S1003: if there is no plane whose distance from the camera is within the first preset distance range in the real environment, placing the target segmentation result in a space, and a distance between the placement position in the space and the camera being a second preset distance.

Exemplarily, if the second preset distance is 0.5 meters, this step is to directly place the target segmentation result in a space with a distance of 0.5 meters from the camera when it is detected that no plane that can be used to place the target segmentation result is within the field of view of 5 meters from the camera. There is no limit on the specific location of placement here, as long as the placement location satisfies the condition of a distance of 0.5 meters from the capturing component.

It should be understood that step S1002 and step S1003 do not limit the sequence of execution.

In an embodiment of the present disclosure, after segmenting the to-be-segmented target object to obtain the target segmentation result in response to the triggering operation performed in the display region where the pre-segmentation result is located, the method of the present embodiment further includes: if the triggering operation by a user is detected on the display region where the target segmentation result is located, determining that the user confirms the target segmentation result, and performing a step of detecting whether there is the plane whose distance from the camera is within the first preset distance range in the real environment within the field of view of the camera.

In the present embodiment, the triggering operation performed in the display region where the pre-segmentation result is located may be triggered by the user through touching the screen, or may be triggered by the user by performing an air gesture operation.

Specifically, the triggering operation by the user on the display region where the target segmentation result is located includes: an operation of releasing the target segmentation result after dragging the target segmentation result for a preset time period.

Exemplarily, if the user selects the target segmentation result in the acquisition image and drags the target segmentation result, it is deemed that the user confirms the target segmentation result and confirms that the operation of fusing the target segmentation result with a real scene captured by the camera is to be performed.

Figure 11A:
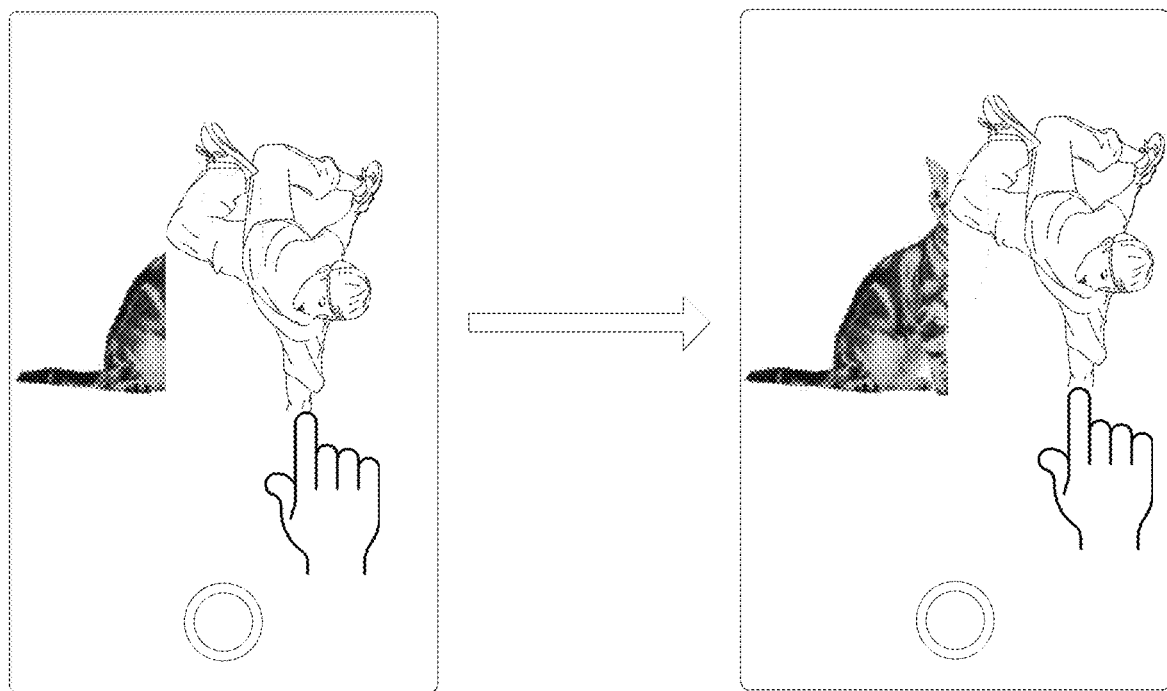
FIG. 11A illustrates a schematic diagram of a user selecting and dragging a target segmentation result in the acquisition image.

Referring to FIG. 11A, FIG. 11A illustrates a schematic diagram of the user selecting and dragging the target segmentation result in the acquisition image.

In one case of the present embodiment, if a portion of the to-be-segmented target object is covered by other objects other than the to-be-segmented target object, the user needs to drag the region corresponding to the portion of the to-be-segmented target object that is not covered by other objects, then it is deemed that the user confirms the target segmentation result and confirms that the operation of fusing the target segmentation result with the to-be-fused video scene is to be performed. It may be understood that if the user drags the to-be-segmented target object corresponding to an explicit display part, it is deemed that the user confirms the target segmentation result and confirms that the operation of fusing the target segmentation result with the to-be-fused video scene is to be performed.

Figure 11B:
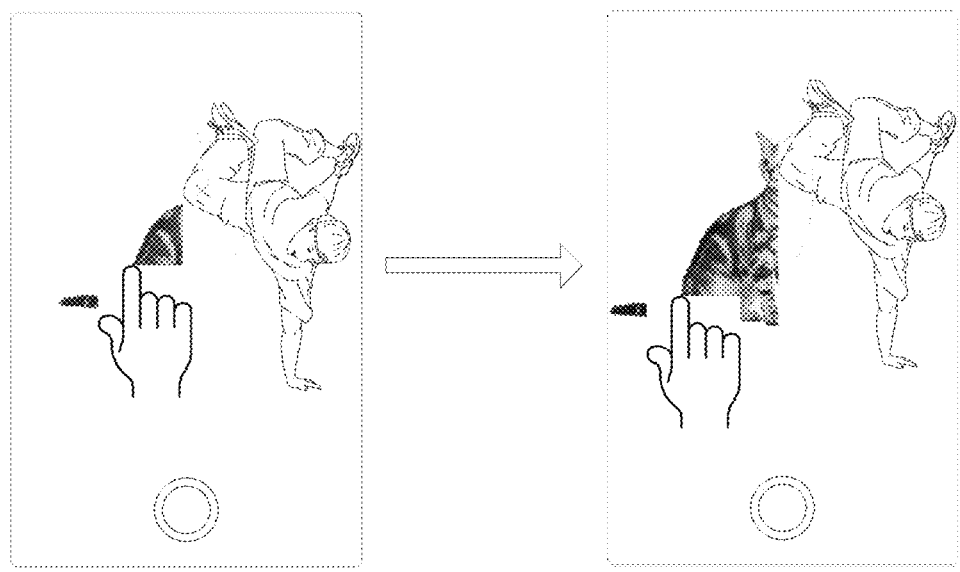
FIG. 11B illustrates a schematic diagram of the user dragging a portion of the to-be-segmented target object that is not covered by other objects.

Referring to FIG. 11B, FIG. 11B illustrates a schematic diagram of the user dragging the portion of the to-be-segmented target object that is not covered by other objects.

Optionally, in the process of dragging the target segmentation result, the user may further perform operations such as rotating, zooming, moving, and the like on the target segmentation result to adjust the placement angle of the target segmentation result, and the placement angle is adjusted to a target angle that is compatible with a detected plane angle, and after the user releases the finger, the target segmentation result after adjusted is placed on the detected plane.

In the embodiment of the present disclosure, by the operation of releasing the target segmentation result after dragging the target segmentation result for the preset time period, it is deemed that the user confirms the target segmentation result, and the operation of fusing the target segmentation result with the to-be-fused video scene starts to be performed. In this case, the steps of the user confirming the target segmentation result and placing the target segmentation result in the real environment acquired by the camera are completed in one operation step, which can simplify the user operation, shorten the overall time of the video capturing process, achieve the effect of improving the efficiency of video capturing and user operation, and thus improve the user experience.

In one embodiment of the present disclosure, before segmenting the to-be-segmented target object to obtain the target segmentation result in response to the input event of selecting the to-be-segmented target object among the plurality of objects presented in the acquisition image of the camera, the method of the present embodiment further includes: acquiring images during a segmentation process of the to-be-segmented target object in response to a triggering operation of a capturing function. The images include a real environment captured by the camera. Correspondingly, fusing the target segmentation result, that is adjusted, with the to-be-fused video scene to generate the video in response to the triggering operation for adjusting the target segmentation result includes: generating the video according to the images during the segmentation process of the to-be-segmented target object.

In the present embodiment, the triggering operation of the capturing function may be understood as triggering the capturing function after the terminal device starts the camera to enter the acquisition image, then the camera may capture the whole segmentation process and the process of the user adjusting the target segmentation result and fusing the target segmentation result after adjusted with the to-be-fused video scene, and generate a video. For example, continuing to refer to FIG. 9, in the state of the rear camera, the objects acquired by the camera include a cat and a person. If the person is the to-be-segmented target object, the whole process of segmentation and adjustment of the person is captured and a video is generated.

In the present embodiment, the triggering operation of the capturing function of the terminal device may be a touch operation on a capturing button in the acquisition image (such as a circular icon below the acquisition image in FIG. 3, FIG. 4, FIG. 5, FIG. 8, FIG. 9, FIG. 11A, and FIG. 11B).

Specifically, the user may trigger the capturing function of the terminal device by clicking the capturing button in the acquisition image, or the user may trigger the capturing function of the terminal device through voice control, or the user may trigger the capturing function of the terminal device through an air gesture operation.

In another embodiment of the present disclosure, fusing the target segmentation result, that is adjusted, with the real environment captured by the camera to generate the video in response to the triggering operation for adjusting the target segmentation result includes: generating the video according to the target segmentation result that is adjusted and the to-be-fused video scene in response to a triggering operation of a capturing function and the triggering operation for adjusting the target segmentation result. The to-be-fused video scene is a video scene outside the real environment captured by the camera.

In the present embodiment, after the user triggers the capturing function, the terminal device may generate a video according to the target segmentation result, that is, the image that the to-be-segmented target object has been picked out. The triggering operation of the capturing function may be understood as that the capturing function is not triggered after the terminal device starts the camera to enter the acquisition image, but after the target segmentation result is segmented and the target segmentation result is adjusted by the user, the capturing function is triggered to fuse the target segmentation result after adjusted with the to-be-fused video scene, and to generate a video. For example, continuing to refer to FIG. 9, in the state of the rear camera, the objects acquired by the camera include a cat and a person. If the person is the to-be-segmented target object, after the person is segmented, the camera may be set as the front camera, and the image captured by the front camera may be fused with the person.

Figure 12:
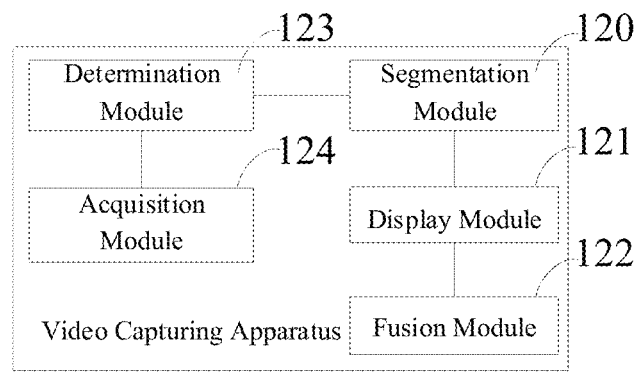
FIG. 12 is a block diagram of a structure of a video capturing apparatus provided by an embodiment of the present disclosure.

Corresponding to the video capturing method of the above-mentioned embodiments, FIG. 12 is a block diagram of a structure of a video capturing apparatus provided by an embodiment of the present disclosure. For convenience of explanation, only parts related to the embodiments of the present disclosure are illustrated. Referring to FIG. 12, the apparatus includes a segmentation module 120, a display module 121, and a fusion module 122. The segmentation module 120 is configured to segment a to-be-segmented target object to obtain a target segmentation result in response to an input event of selecting the to-be-segmented target object among a plurality of objects presented in an acquisition image of the camera; the display module 121 is configured to display the target segmentation result; and the fusion module 122 is configured to fuse the target segmentation result, that is adjusted, with a to-be-fused video scene to generate a video in response to a triggering operation for adjusting the target segmentation result.

In one embodiment of the present disclosure, the apparatus further includes a determination module 123, and the determination module 123 is configured to determine that a displayed object is the to-be-segmented target object if an image region where the object displayed in the acquisition image is located includes a preset cursor.

In one embodiment of the present disclosure, the segmentation module 120 is specifically configured to perform the following steps: pre-segmenting the to-be-segmented target object to obtain a pre-segmentation result in response to the input event of selecting the to-be-segmented target object among the plurality of objects presented in the acquisition image of the camera; displaying the pre-segmentation result; and segmenting the to-be-segmented target object to obtain the target segmentation result in response to a triggering operation performed in a display region where the pre-segmentation result is located.

In one embodiment of the present disclosure, the segmentation module 120 is specifically configured to perform the following steps: pre-segmenting the to-be-segmented target object according to a first segmentation model to obtain the pre-segmentation result in response to the input event of selecting the to-be-segmented target object among the plurality of objects presented in the acquisition image of the camera, the first segmentation model being obtained by training a neural network according to a plurality of training images, and each of the plurality of training image including a plurality of objects; segmenting the to-be-segmented target object to obtain the target segmentation result in response to the triggering operation performed in the display region where the pre-segmentation result is located, segmenting the to-be-segmented target object according to a second segmentation model to obtain the target segmentation result, the second segmentation model being obtained by training a neural network according to a plurality of training images, and each of the plurality of training image including a plurality of objects. The segmentation speed of the first segmentation model is greater than the preset segmentation speed, and the segmentation accuracy of the first segmentation model is smaller than the segmentation accuracy of the second segmentation model.

In one embodiment of the present disclosure, the display module 121 is specifically configured to perform the following steps: outlining the pre-segmentation result; and displaying an outline of the pre-segmentation result.

In one embodiment of the present disclosure, the display module 121 is specifically configured to perform the following steps: if a portion of the to-be-segmented target object is covered by other objects other than the to-be-segmented target object, displaying an outline of a covered portion of the to-be-segmented target object in a first display state, and displaying an outline of an uncovered portion of the to-be-segmented target object in a second display state. The display attribute of the first display state is different from the display attribute of the second display state.

In one embodiment of the present disclosure, the first display state is a semi-transparent display state, and the second display state is an explicit display state.

In one embodiment of the present disclosure, the fusion module 122 is specifically configured to perform the following steps: if the triggering operation is detected on the display region where the target segmentation result is located, detecting whether there is a plane whose distance from the camera is within a first preset distance range in a real environment within a field of view of the camera; if there is a plane whose distance from the camera is within the first preset distance range in the real environment, placing the target segmentation result on the plane; and if there is no plane whose distance from the camera is within the first preset distance range in the real environment, placing the target segmentation result in a space, a distance between a placement position in the space and the camera is a second preset distance.

In one embodiment of the present disclosure, the determination module 123 is further configured to perform the following steps: if the triggering operation by a user being detected on the display region where the target segmentation result is located, determining that the user confirms the target segmentation result, and performing a step of detecting whether there is the plane whose distance from the camera is within the first preset distance range in the real environment within the field of view of the camera.

In one embodiment of the present disclosure, the triggering operation by the user on the display region where the target segmentation result is located includes: an operation of releasing the target segmentation result after dragging the target segmentation result for a preset time period.

In one embodiment of the present disclosure, the apparatus further includes an acquisition module 124, and the acquisition module 124 is configured to acquire images during a segmentation process of the to-be-segmented target object in response to a triggering operation of a capturing function. The images include a real environment captured by the camera. In this case, the fusion module 123 is specifically configured to generate the video according to the images during the segmentation process of the to-be-segmented target object.

In one embodiment of the present disclosure, the fusion module 123 is specifically configured to perform the following steps: generating the video according to the target segmentation result that is adjusted and the to-be-fused video scene in response to a triggering operation of a capturing function and the triggering operation for adjusting the target segmentation result. The to-be-fused video scene is a video scene outside the real environment captured by the camera.

In one embodiment of the present disclosure, the triggering operation for adjusting the target segmentation result includes at least one selected from a group consisting of: zooming out, zooming in, moving, and rotating.

The video capturing apparatus provided by the present embodiment may be used to implement the technical solutions of the above-mentioned method embodiments, and the implementation principles and technical effects of the method and the apparatus are similar, and details are not described here again in the present embodiment.

Figure 13:
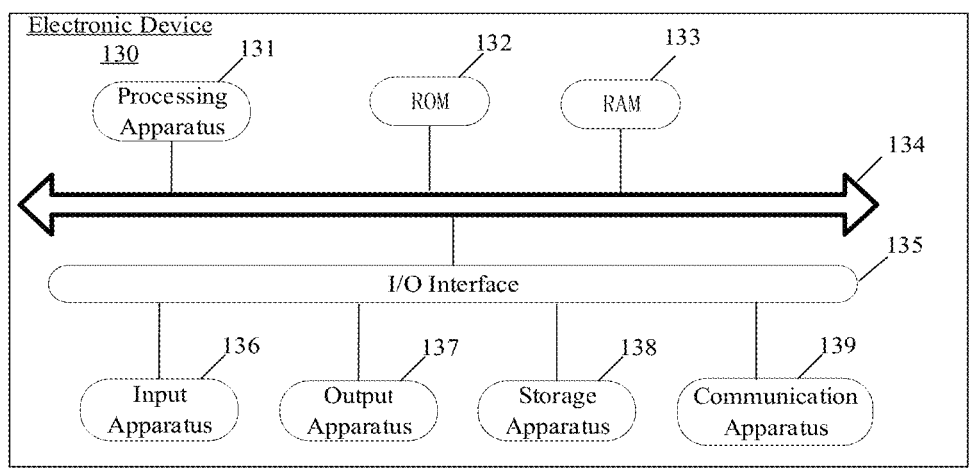
FIG. 13 is a schematic diagram of a hardware structure of an electronic device provided by an embodiment of the present disclosure.

Referring to FIG. 13, FIG. 13 illustrates a schematic diagram of a structure of an electronic device 130 suitable for implementing the embodiments of the present disclosure, and the electronic device 130 may be a terminal device or a server. The terminal device may include, but is not limited to, mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 13 is merely an example, and should not pose any limitation to the functions and the range of use of the embodiments of the present disclosure.

As illustrated in FIG. 13, the electronic device 130 may include a processing apparatus 131 (e.g., a central processing unit, a graphics processing unit, etc.), which can perform various suitable actions and processing according to a program stored in a read-only memory (ROM) 132 or a program loaded from a storage apparatus 138 into a random-access memory (RAM) 133. The RAM 133 further stores various programs and data required for operations of the electronic device 130. The processing apparatus 131, the ROM 132, and the RAM 133 are interconnected by means of a bus 134. An input/output (I/O) interface 135 is also connected to the bus 134.

Usually, the following apparatus may be connected to the I/O interface 135: an input apparatus 136 including, for example, a touch screen, a touch pad, a keyboard, a mouse, a camera, a microphone, an accelerometer, a gyroscope, or the like; an output apparatus 137 including, for example, a liquid crystal display (LCD), a loudspeaker, a vibrator, or the like; a storage apparatus 138 including, for example, a magnetic tape, a hard disk, or the like; and a communication apparatus 139. The communication apparatus 139 may allow the electronic device 130 to be in wireless or wired communication with other devices to exchange data. While FIG. 13 illustrates the electronic device 130 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 139 and installed, or may be installed from the storage apparatus 138, or may be installed from the ROM 132. When the computer program is executed by the processing apparatus 131, the above-mentioned functions defined in the methods of some embodiments of the present disclosure are performed.

It should be noted that the above-described computer-readable medium according to the present disclosure may be a computer-readable signal medium or a computer-readable storage medium, or any combination thereof. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a random access memory (RAM), a read-only memory (ROM); an erasable programmable read-only memory (EPROM or flash memory); an optical fiber, a portable compact disc read-only memory (CD-ROM); an optical storage device; a magnetic storage device; or any suitable combination of the above. In the present disclosure, the computer-readable storage medium may be any tangible medium that contains or stores a program that may be used by or in conjunction with an instruction executing system, an apparatus, or a device. Rather, in the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a radio frequency (RF), etc., or any suitable combination of the above.

The above-described computer-readable medium may be included in the above-described electronic device, or may also exist alone without being assembled into the electronic device.

The above-described computer-readable medium carries one or more programs, and when the above-described one or more programs are executed by the electronic device, the electronic device is caused to perform the methods illustrated in the above-mentioned embodiments.

The computer program codes for executing the operations according to the present disclosure may be written in one or more programming languages or a combination thereof; the above-described programming languages include, but not limited to, object-oriented programming languages such as Java, Smalltalk, C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In the scenario involving the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which comprises one or more executable instructions for implementing specified logical function(s). It should also be noted that, in some alternative implementations, the functions noted in the block may occur out of the order noted in the accompanying drawings. For example, two blocks shown in succession may, in fact, be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The modules or units involved in the embodiments of the present disclosure may be implemented in software or hardware. Among them, the name of the module or unit does not constitute a limitation of the unit itself under certain circumstances, for example, the first acquisition unit may also be described as "a unit that acquires at least two Internet Protocol addresses."

The functions described herein above may be executed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, a machine-readable medium may be a tangible medium, which may contain or store programs for use by or in combination with an instruction execution system, an apparatus or a device. The machine-readable medium may be a machine-readable signal medium or a machine-readable storage medium. Machine-readable media may include, but are not limited to, electronic, magnetic, optical, electromagnetic, infrared, or semiconductor systems, apparatuses, or devices, or any suitable combination of the above contents. A more specific example of the machine-readable storage medium may include an electrical connection based on one or more lines, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above contents.

In a first aspect, a video capturing method is provided according to one or more embodiments of the present disclosure, the method is applied to a terminal device, the terminal device includes a camera, and the method includes: segmenting a to-be-segmented target object to obtain a target segmentation result in response to an input event of selecting the to-be-segmented target object among a plurality of objects presented in an acquisition image of the camera; displaying the target segmentation result; and fusing the target segmentation result, that is adjusted, with a to-be-fused video scene to generate a video in response to a triggering operation for adjusting the target segmentation result.

According to one or more embodiments of the present disclosure, before segmenting the to-be-segmented target object to obtain the target segmentation result in response to the input event of selecting the to-be-segmented target object among the plurality of objects presented in the acquisition image of the camera, the method further comprises: in the case where an image region where an object displayed in the acquisition image is located comprises a preset cursor, determining that the object is the to-be-segmented target object.

According to one or more embodiments of the present disclosure, segmenting the to-be-segmented target object to obtain the target segmentation result in response to the input event of selecting the to-be-segmented target object among the plurality of objects presented in the acquisition image of the camera comprises: pre-segmenting the to-be-segmented target object to obtain a pre-segmentation result in response to the input event of selecting the to-be-segmented target object among the plurality of objects presented in the acquisition image of the camera; displaying the pre-segmentation result; and segmenting the to-be-segmented target object to obtain the target segmentation result in response to a triggering operation performed in a display region where the pre-segmentation result is located.

According to one or more embodiments of the present disclosure, pre-segmenting the to-be-segmented target object to obtain the pre-segmentation result in response to the input event of selecting the to-be-segmented target object among the plurality of objects presented in the acquisition image of the camera comprises: pre-segmenting the to-be-segmented target object according to a first segmentation model to obtain the pre-segmentation result in response to the input event of selecting the to-be-segmented target object among the plurality of objects presented in the acquisition image of the camera, where the first segmentation model is obtained by training a neural network according to a plurality of training images, and each of the plurality of training image comprises a plurality of objects. Segmenting the to-be-segmented target object to obtain the target segmentation result in response to the triggering operation performed in the display region where the pre-segmentation result is located comprises: segmenting the to-be-segmented target object to obtain the target segmentation result in response to the triggering operation performed in the display region where the pre-segmentation result is located, segmenting the to-be-segmented target object according to a second segmentation model to obtain the target segmentation result, where the second segmentation model is obtained by training a neural network according to a plurality of training images, and each of the plurality of training image comprises a plurality of objects. A segmentation speed of the first segmentation model is greater than a preset segmentation speed, and a segmentation accuracy of the first segmentation model is smaller than a segmentation accuracy of the second segmentation model.

According to one or more embodiments of the present disclosure, displaying the pre-segmentation result comprises: outlining the pre-segmentation result; and displaying an outline of the pre-segmentation result.

According to one or more embodiments of the present disclosure, displaying the outline of the pre-segmentation result comprises: in the case where a portion of the to-be-segmented target object is covered by other objects other than the to-be-segmented target object, displaying an outline of a covered portion of the to-be-segmented target object in a first display state, and displaying an outline of an uncovered portion of the to-be-segmented target object in a second display state. A display attribute of the first display state is different from a display attribute of the second display state.

According to one or more embodiments of the present disclosure, the first display state is a semi-transparent display state, and the second display state is an explicit display state.

According to one or more embodiments of the present disclosure, the method further comprises: place the target segmentation result in a real environment.

According to one or more embodiments of the present disclosure, fusing the target segmentation result, that is adjusted, with the to-be-fused video scene to generate the video in response to the triggering operation for adjusting the target segmentation result comprises: in the case where the triggering operation is detected on a display region where the target segmentation result is located, detecting whether there is a plane whose distance from the camera is within a first preset distance range in a real environment within a field of view of the camera; in the case where there is the plane whose distance from the camera is within the first preset distance range in the real environment, placing the target segmentation result on the plane; and in the case where there is no plane whose distance from the camera is within the first preset distance range in the real environment, placing the target segmentation result in a space. A distance between a placement position in the space and the camera is a second preset distance.

According to one or more embodiments of the present disclosure, after segmenting the to-be-segmented target object to obtain the target segmentation result in response to the triggering operation performed in the display region where the pre-segmentation result is located, the method further comprises: in the case where the triggering operation by a user is detected on the display region where the target segmentation result is located, determining that the user confirms the target segmentation result, and performing a step of detecting whether there is the plane whose distance from the camera is within the first preset distance range in the real environment within the field of view of the camera.

According to one or more embodiments of the present disclosure, the triggering operation by the user on the display region where the target segmentation result is located comprises: an operation of releasing the target segmentation result after dragging the target segmentation result for a preset time period.

According to one or more embodiments of the present disclosure, before segmenting the to-be-segmented target object to obtain the target segmentation result in response to the input event of selecting the to-be-segmented target object among the plurality of objects presented in the acquisition image of the camera, the method further comprises: acquiring images during a segmentation process of the to-be-segmented target object in response to a triggering operation of a capturing function, where the images comprise a real environment captured by the camera. Fusing the target segmentation result, that is adjusted, with the to-be-fused video scene to generate the video in response to the triggering operation for adjusting the target segmentation result comprises: generating the video according to the images during the segmentation process of the to-be-segmented target object.

According to one or more embodiments of the present disclosure, fusing the target segmentation result, that is adjusted, with a real environment captured by the camera to generate the video in response to the triggering operation for adjusting the target segmentation result comprises: generating the video according to the target segmentation result, that is adjusted, and the to-be-fused video scene in response to a triggering operation of a capturing function and the triggering operation for adjusting the target segmentation result. The to-be-fused video scene is a video scene outside the real environment captured by the camera.

According to one or more embodiments of the present disclosure, the triggering operation for adjusting the target segmentation result comprises at least one selected form a group consisting of: zooming out, zooming in, moving, and rotating.

In a second aspect, a video capturing apparatus is provided according to one or more embodiments of the present disclosure. The video capturing apparatus comprises: a segmentation module, configured to segment a to-be-segmented target object to obtain a target segmentation result in response to an input event of selecting the to-be-segmented target object among a plurality of objects presented in an acquisition image of the camera; a display module, configured to display the target segmentation result; and a fusion module, configured to fuse the target segmentation result, that is adjusted, with a to-be-fused video scene to generate a video in response to a triggering operation for adjusting the target segmentation result.

According to one or more embodiments of the present disclosure, the apparatus further comprises a determination module, which is configured to determine that the displayed object is the to-be-segmented target object in the case where an image region where an object displayed in the acquisition image is located comprises a preset cursor.

According to one or more embodiments of the present disclosure, the segmentation module is specifically configured to: pre-segment the to-be-segmented target object to obtain a pre-segmentation result in response to the input event of selecting the to-be-segmented target object among the plurality of objects presented in the acquisition image of the camera; display the pre-segmentation result; and segment the to-be-segmented target object to obtain the target segmentation result in response to a triggering operation performed in a display region where the pre-segmentation result is located.

According to one or more embodiments of the present disclosure, the segmentation module is specifically configured to: pre-segment the to-be-segmented target object according to a first segmentation model to obtain the pre-segmentation result in response to the input event of selecting the to-be-segmented target object among the plurality of objects presented in the acquisition image of the camera, where the first segmentation model is obtained by training a neural network according to a plurality of training images, and each of the plurality of training image comprises a plurality of objects; segment the to-be-segmented target object to obtain the target segmentation result in response to the triggering operation performed in the display region where the pre-segmentation result is located, and segment the to-be-segmented target object according to a second segmentation model to obtain the target segmentation result, where the second segmentation model is obtained by training a neural network according to a plurality of training images, and each of the plurality of training image comprises a plurality of objects. A segmentation speed of the first segmentation model is greater than a preset segmentation speed, and a segmentation accuracy of the first segmentation model is smaller than a segmentation accuracy of the second segmentation model.

According to one or more embodiments of the present disclosure, the display module is specifically configured to: outline the pre-segmentation result; and display an outline of the pre-segmentation result.

According to one or more embodiments of the present disclosure, the display module is specifically configured to: in the case where a portion of the to-be-segmented target object is covered by other objects other than the to-be-segmented target object, display an outline of a covered portion of the to-be-segmented target object in a first display state, and display an outline of an uncovered portion of the to-be-segmented target object in a second display state. A display attribute of the first display state is different from a display attribute of the second display state.

According to one or more embodiments of the present disclosure, the first display state is a semi-transparent display state, and the second display state is an explicit display state.

According to one or more embodiments of the present disclosure, the fusion module is specifically configured to: in the case where the triggering operation is detected on a display region where the target segmentation result is located, detect whether there is a plane whose distance from the camera is within a first preset distance range in a real environment within a field of view of the camera; in the case where there is the plane whose distance from the camera is within the first preset distance range in the real environment, place the target segmentation result on the plane; and in the case where there is no plane whose distance from the camera is within the first preset distance range in the real environment, place the target segmentation result in a space. A distance between a placement position in the space and the camera is a second preset distance.

According to one or more embodiments of the present disclosure, the determination module is further configured to: in the case where the triggering operation by a user is detected on the display region where the target segmentation result is located, determine that the user confirms the target segmentation result, and perform a step of detecting whether there is the plane whose distance from the camera is within the first preset distance range in the real environment within the field of view of the camera.

According to one or more embodiments of the present disclosure, the triggering operation by the user on the display region where the target segmentation result is located comprises: an operation of releasing the target segmentation result after dragging the target segmentation result for a preset time period.

According to one or more embodiments of the present disclosure, the apparatus further comprises an acquisition module, which is configured to acquire images during a segmentation process of the to-be-segmented target object in response to a triggering operation of a capturing function. The images comprise a real environment captured by the camera. The fusion module is specifically configured to generate the video according to the images during the segmentation process of the to-be-segmented target object.

According to one or more embodiments of the present disclosure, the fusion module is specifically configured to generate the video according to the target segmentation result, that is adjusted, and the to-be-fused video scene in response to a triggering operation of a capturing function and the triggering operation for adjusting the target segmentation result. The to-be-fused video scene is a video scene outside the real environment captured by the camera.

According to one or more embodiments of the present disclosure, the triggering operation for adjusting the target segmentation result comprises at least one selected form a group consisting of: zooming out, zooming in, moving, and rotating.

In a third aspect, an electronic device is provided according to one or more embodiments of the present disclosure. The electronic device comprises at least one processor and a memory. The memory stores computer-executable instructions; and the at least one processor executes the computer-executable instructions stored in the memory to cause the at least one processor to perform the method above-mentioned in the first aspect and various possible designs of the first aspect.

In a fourth aspect, a computer-readable storage medium is provided according to one or more embodiments of the present disclosure. Computer-executable instructions are stored in the computer-readable storage medium, and when a processor executes the computer-executable instructions, the processor implements the method above-mentioned in the first aspect and various possible designs of the first aspect.

The above description is only preferred embodiments of the present disclosure and explanation of the applied technical principles. Those skilled in the art should understand that the scope of disclosure involved in the present disclosure is not only limited to the technical solutions formed by the specific combination of the above-described technical features, but also covers other technical solutions formed by an arbitrary combination of the above-described technical features or equivalent features thereof without departing from the above-described disclosure concept. For example, the above-described features and the technical features disclosed in the present disclosure (but not limited thereto) and having similar functions are replaced each other to form a technical solution.

Furthermore, although the respective operations are described in a particular order, this should not be understood as requiring the operations to be executed in the particular order shown or in a sequential order. Under certain circumstances, multitasking and parallel processing may be favorable. Similarly, although the above discussion contains a number of specific implementation details, these should not be interpreted as limiting the scope of the present disclosure. Certain features as described in the context of separate embodiments may also be implemented in a single embodiment in combination. Conversely, various features as described in the context of a single embodiment may also be implemented in a plurality of embodiments individually or in any suitable sub-combination.

Although the subject matter has been described in terms specific to the structural features and/or method logic actions, it should be understood that the subject matter defined in the appended claims is not necessarily limited to the specific features or actions as described above. On the contrary, the specific features and actions as described above are only examples of implementing the claims.

What is claimed is:

1. A video capturing method, applied to a terminal device, wherein the terminal device comprises a camera, and the method comprises:
    segmenting a to-be-segmented target object to obtain a target segmentation result in response to an input event of selecting the to-be-segmented target object among a plurality of objects presented in an acquisition image of the camera;
    displaying the target segmentation result; and
    fusing the target segmentation result, that is adjusted, with a to-be-fused video scene to generate a video in response to a triggering operation for adjusting the target segmentation result;
    wherein fusing the target segmentation result that is adjusted with the to-be-fused video scene to generate the video comprises:
    placing the target segmentation result in a video scene of a real environment captured by the camera by using simultaneous localization and mapping (SLAM) technology, and fusing the target segmentation result, that is adjusted, with the video scene of the real environment captured by the camera.

2. The method according to claim 1, wherein before segmenting the to-be-segmented target object to obtain the target segmentation result in response to the input event of selecting the to-be-segmented target object among the plurality of objects presented in the acquisition image of the camera, the method further comprises:
    in a case where an image region where an object displayed in the acquisition image is located comprises a preset cursor, determining that the object is the to-be-segmented target object.

3. The method according to claim 1, wherein segmenting the to-be-segmented target object to obtain the target segmentation result in response to the input event of selecting the to-be-segmented target object among the plurality of objects presented in the acquisition image of the camera comprises:
    pre-segmenting the to-be-segmented target object to obtain a pre-segmentation result in response to the input event of selecting the to-be-segmented target object among the plurality of objects presented in the acquisition image of the camera;
displaying the pre-segmentation result; and
segmenting the to-be-segmented target object to obtain the target segmentation result in response to a triggering operation performed in a display region where the pre-segmentation result is located.

4. The method according to claim 3, wherein pre-segmenting the to-be-segmented target object to obtain the pre-segmentation result in response to the input event of selecting the to-be-segmented target object among the plurality of objects presented in the acquisition image of the camera comprises:
pre-segmenting the to-be-segmented target object according to a first segmentation model to obtain the pre-segmentation result in response to the input event of selecting the to-be-segmented target object among the plurality of objects presented in the acquisition image of the camera, wherein the first segmentation model is obtained by training a neural network according to a plurality of training images, and each of the plurality of training image comprises a plurality of objects;
segmenting the to-be-segmented target object to obtain the target segmentation result in response to the triggering operation performed in the display region where the pre-segmentation result is located comprises:
segmenting the to-be-segmented target object to obtain the target segmentation result in response to the triggering operation performed in the display region where the pre-segmentation result is located, and segmenting the to-be-segmented target object according to a second segmentation model to obtain the target segmentation result, wherein the second segmentation model is obtained by training a neural network according to a plurality of training images, and each of the plurality of training image comprises a plurality of objects,
wherein a segmentation speed of the first segmentation model is greater than a preset segmentation speed, and a segmentation accuracy of the first segmentation model is smaller than a segmentation accuracy of the second segmentation model.

5. The method according to claim 3, wherein displaying the pre-segmentation result comprises:
outlining the pre-segmentation result; and
displaying an outline of the pre-segmentation result.

6. The method according to claim 5, wherein displaying the outline of the pre-segmentation result comprises:
in a case where a portion of the to-be-segmented target object is covered by other objects other than the to-be-segmented target object, displaying an outline of a covered portion of the to-be-segmented target object in a first display state, and displaying an outline of an uncovered portion of the to-be-segmented target object in a second display state, wherein a display attribute of the first display state is different from a display attribute of the second display state.

7. The method according to claim 6, wherein the first display state is a serer transparent display state, and the second display state is an explicit display state.

8. The method according to claim 3, wherein fusing the target segmentation result, that is adjusted, with the to-be-fused video scene to generate the video in response to the triggering operation for adjusting the target segmentation result comprises:
in a case where the triggering operation is detected on a display region where the target segmentation result is located, detecting whether there is a plane whose distance from the camera is within a first preset distance range in the real environment within a field of view of the camera;
in a case where there is the plane whose distance from the camera is within the first preset distance range in the real environment, placing the target segmentation result on the plane; and
in a case where there is no plane whose distance from the camera is within the first preset distance range in the real environment, placing the target segmentation result in a space, wherein a distance between a placement position in the space and the camera is a second preset distance.

9. The method according to claim 8, wherein after segmenting the to-be segmented target object to obtain the target segmentation result in response to the triggering operation performed in the display region where the pre-segmentation result is located, the method further comprises:
in a case where the triggering operation by a user is detected on the display region where the target segmentation result is located, determining that the user confirms the target segmentation result, and performing a step of detecting whether there is the plane whose distance from the camera is within the first preset distance range in the real environment within the field of view of the camera.

10. The method according to claim 9, wherein the triggering operation by the user on the display region where the target segmentation result is located comprises: an operation of releasing the target segmentation result after dragging the target segmentation result for a preset time period.

11. The method according to claim 1, wherein before obtaining the target segmentation result, the method further comprises:
acquiring images during a segmentation process of the to-be-segmented target object in response to a triggering operation of a capturing function, wherein the images comprise the real environment captured by the camera;
fusing the target segmentation result, that is adjusted, with the to-be-fused video scene to generate the video in response to the triggering operation for adjusting the target segmentation result further comprises:
generating the video according to the images captured during the segmentation process of the to-be-segmented target object.

12. The method according to claim 1, wherein fusing the target segmentation result, that is adjusted, with the to-be-fused video scene to generate the video in response to the triggering operation for adjusting the target segmentation result comprises:
generating the video according to the target segmentation result, that is adjusted, and the to-be-fused video scene in response to a triggering operation of a capturing function and the triggering operation for adjusting the target segmentation result, wherein the to-be-fused video scene is a video scene outside the real environment captured by the camera.

13. The method according to claim 1, wherein the triggering operation for adjusting the target segmentation result comprises at least one selected form a group consisting of; zooming out, zooming in, moving, and rotating.

14. The method according to claim 2, wherein segmenting the to-be-segmented target object to obtain the target segmentation result in response to the input event of selecting the to-be-segmented target object among the plurality of objects presented in the acquisition image of the camera comprises:

pre-segmenting the to-be-segmented target object to obtain a pre-segmentation result in response to the input event of selecting the to-be-segmented target object among the plurality of objects presented in the acquisition image of the camera;

displaying the pre-segmentation result; and segmenting the to-be-segmented target object to obtain the target segmentation result in response to a triggering operation performed in a display region where the pre-segmentation result is located.

15. The method according to claim 4, wherein displaying the pre-segmentation result comprises:

outlining the pre-segmentation result; and displaying an outline of the pre-segmentation result.

16. The method according to claim 4, wherein fusing the target segmentation result, that is adjusted, with the to-be-fused video scene to generate the video in response to the triggering operation for adjusting the target segmentation result comprises:

in a case where the triggering operation is detected on a display region where the target segmentation result is located, detecting whether there is a plane whose distance from the camera is within a first preset distance range in the real environment within a field of view of the camera;

in a case where there is the plane whose distance from the camera is within the first preset distance range in the real environment, placing the target segmentation result on the plane; and in a case where there is no plane whose distance from the camera is within the first preset distance range in the real environment, placing the target segmentation result in a space, wherein a distance between a placement position in the space and the camera is a second preset distance.

17. The method according to claim 5, wherein fusing the target segmentation result, that is adjusted, with the to-be-fused video scene to generate the video in response to the triggering operation for adjusting the target segmentation result comprises:

in a ease where the triggering operation is detected on a display region where the target segmentation result is located, detecting whether there is a plane whose distance from the camera is within a first preset distance range in the real environment within a field of view of the camera;

in a case where there is the plane whose distance from the camera is within the first preset distance range in the real environment, placing the target segmentation result on the plane; and in a case where there is no plane whose distance from the camera is within the first preset distance range in the real environment, placing the target segmentation result in a space, wherein a distance between a placement position in the space and the camera is a second preset distance.

18. A video capturing apparatus, comprising:

a segmentation module, configured to segment a to-be-segmented target object to obtain a target segmentation result in response to an input event of selecting the to-be-segmented target object among a plurality of objects presented in an acquisition image of a camera;

a display module, configured to display the target segmentation result; and a fusion module, configured to fuse the target segmentation result, that is adjusted, with a to-be-fused video scene to generate a video in response to a triggering operation for adjusting the target segmentation result;

wherein fusing the target segmentation result that is adjusted with the to-be-fused video scene to generate the video comprises:

placing the target segmentation result in a video scene of a real environment captured by the camera by using simultaneous localization and mapping (SLAM) technology, and fusing the target segmentation result, that is adjusted, with the real environment captured by the camera.

19. An electronic device, comprising at least one processor and a memory, wherein the memory stores computer-executable instructions; and the at least one processor is configured to execute the computer-executable instructions stored in the memory to cause the at least one processor to perform the method according to claim 1.

20. A non-transitory computer-readable storage medium, wherein computer-executable instructions are stored in the computer-readable storage medium, and when a processor executes the computer-executable instructions, the processor implements the method according to claim 1.

* * * * *